E. L. EVANS.
ARTIFICIAL BAIT.
APPLICATION FILED NOV. 25, 1912.
1,089,915.   Patented Mar. 10, 1914.
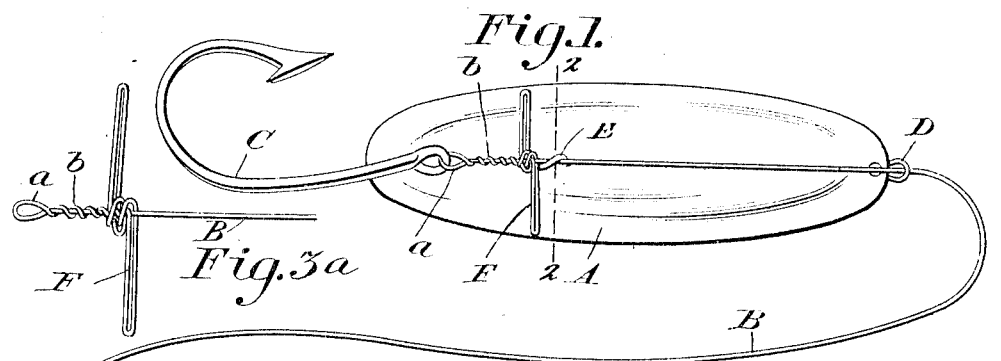
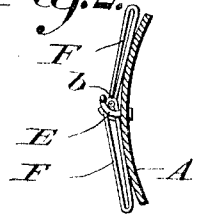
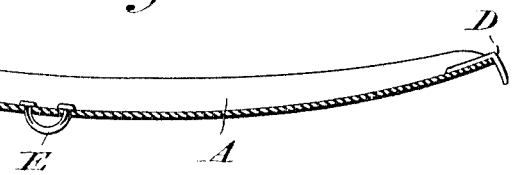
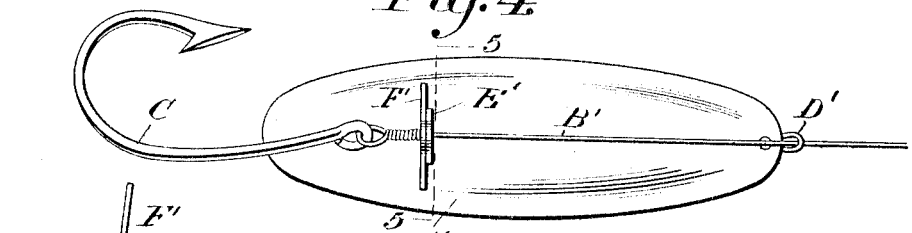
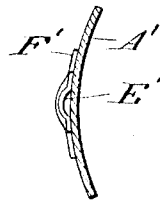
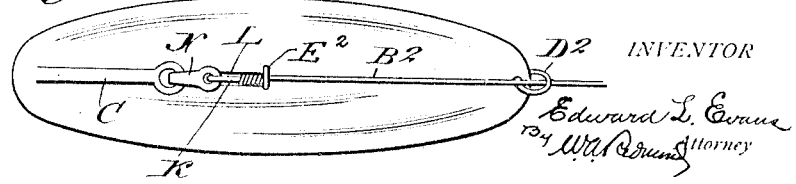
WITNESSES
Philip E. Barnes
S. E. Atkinson.
INVENTOR
Edward L. Evans
By W. A. Barnes Attorney

UNITED STATES PATENT OFFICE.

EDWARD LEWIS EVANS, OF FORT MYERS, FLORIDA.

ARTIFICIAL BAIT.

1,089,915.  Specification of Letters Patent.  Patented Mar. 10, 1914.

Application filed November 25, 1912. Serial No. 733,411.

*To all whom it may concern:*

Be it known that I, EDWARD L. EVANS, a citizen of the United States, residing at Fort Myers, in the county of Lee and State of Florida, have invented a certain new and useful Artificial Bait, of which the following is a specification.

This invention relates to artificial bait for fish, and particularly to spoon bait, and it has for its object to provide a simple, comparatively inexpensive spoon bait in which the distance the trolling spoon may slide after the fish has been hooked is practically unlimited and in which the spoon and hook are forced to revolve or spin in unison, whereby the hook is always held in proper relative position with the spoon, and it consists of the parts and combination of parts hereinafter described and claimed.

In the accompanying drawings forming a part of this specification, Figure 1 is a side elevation of a spoon constructed according to my invention. Fig. 2 is a transverse section on the line 2—2, Fig. 1. Fig. 3 is a central longitudinal section. Fig. 3$^a$ is a detail view of one end portion of the snood showing the crossbar formed thereon. Fig. 4 is a side elevation showing a modified form of the invention. Fig. 5 is a transverse section on the line 5—5, Fig. 4. Fig. 5$^a$ is a detail view showing a modified form of crossbar. Fig. 6 is a side elevation showing another modification of the invention. Fig. 6$^a$ is a detail view.

Similar letters refer to similar parts throughout all the views.

Referring to the drawings A represents the spoon, B the snood, and C the hook. The spoon may be of the shape shown or of any suitable or preferred form.

As shown in Fig. 1 a loop D is fixed at one end of the spoon and at a suitable distance from the opposite end of the spoon an eye E is secured obliquely across the median line of the spoon. As best shown in Fig. 3 the eye E is secured to the spoon by inserting its ends through openings in the spoon and swaging said ends, but any other preferred means of firmly securing the eye in place may be employed. The snood B is formed of wire, and, as shown in Figs. 1, 2, and 3$^a$, one end thereof is passed through the eye of a hook, C, and bent to form a loop $a$, and coiled or wrapped on the wire for a short distance, as at $b$, in order to secure the snood and hook together, and is then bent outwardly at right angles and, at a point at or near one edge of the spoon, is bent on itself and carried back to the body wire and given a turn thereon and is then carried outwardly to the opposite edge of the spoon, bent on itself and brought back to the body wire and bent around the same to secure it thereto, thus forming a crossbar F. The crossbar F serves a double purpose, first, to limit the approach of the spoon to the hook, but leaving it free to slide away from the hook the whole length of the snood or the distance between the crossbar and the swivel G usually connected therewith, after the fish has been hooked, and, second, to so connect the spoon and hook that the latter is caused to revolve or spin in unison with the spoon. Thus while the longitudinal movement of the spoon away from the hook is unimpeded, when the fish is hooked, its approach to the hook is limited by the crossbar, and while the hook and spoon are not directly connected or fastened together the spinning movement of the spoon is imparted to the hook by reason of the crossbar engaging the same, and the proper relative position of the hook and spoon is maintained.

In Figs. 4, 5, and 5$^a$ the spoon A′ is shown with a fixed loop D′ at one end of the spoon and a transversely arranged eye E′ secured thereto. The eye E′, in this instance, is formed of a metal bar bent to form the eye and having its ends welded or soldered to the spoon. The snood B′ is shown as formed with an eye to connect with the hook and a crossbar F′, consisting of metal bar welded or otherwise rigidly secured to the snood and extending at right angles thereto so as to act, in connection with eye E′, to limit movement of the spoon toward the hook, and also to engage the spoon at opposite sides of the snood in order to cause the hook to spin in unison with the spoon in a manner similar to that described above.

In Figs. 6 and 6$^a$ the spoon A$^2$ is shown with a loose ring or loop D$^2$ at one end and with an eye E$^2$ firmly secured transversely the spoon. Adjacent the eye E$^2$ and along the median line of the spoon a slot L is formed, said slot being of a width to permit of the easy entrance edgewise of the loop K formed on the end of the snood B$^2$, a chain link N forming the connection between the hook and the snood. In this form of the device the connection between the hook and the spoon is made by the loop K entering the slot and thus causing the hook and spoon to spin in unison, while the approach of the spoon to the hook is limited by the loop K and the eye $E^2$ in a manner similar to that above described.

Having thus described my invention what I claim as new and desire to secure by Letters Patent is:

1. An artificial bait, comprising a spoon, a hook, a snood, means on one face of the spoon through which said snood passes freely lengthwise, and means movable into and out of engagement with the spoon for limiting the approach of the spoon to the hook.

2. An artificial bait comprising a spoon, a hook, and a snood, means on one face of the spoon through which the snood passes lengthwise, and means carried by the snood and movable into and out of engagement with the spoon for limiting the approach of the spoon to the hook and for holding the spoon and hook in rotative connection when so engaged.

3. An artificial bait, comprising a spoon, a hook, and a snood, the snood being slidably connected to one face of the spoon and formed to limit the approach of the spoon to the hook and to cause the spoon and hook to rotate in unison.

In testimony whereof, I affix my signature, in the presence of two witnesses.

EDWARD LEWIS EVANS.

Witnesses:
J. H. L. THOMPSON,
W. M. STANNARD.

---

Copies of this patent may be obtained for five cents each, by addressing the "Commissioner of Patents, Washington, D. C."